Oct. 6, 1959 J. A. ROSS 2,907,838

ELECTRICAL EQUALIZERS IN AMPLIFIER CIRCUITS

Filed Feb. 14, 1957

INVENTOR.
JAMES A. ROSS

BY Harry R. Lubcke
AGENT

United States Patent Office 2,907,838

Patented Oct. 6, 1959

2,907,838

ELECTRICAL EQUALIZERS IN AMPLIFIER CIRCUITS

James A. Ross, San Fernando, Calif., assignor to Ling Electronics, Inc., Culver City, Calif., a corporation of California Application February 14, 1957, Serial No. 640,214

6 Claims. (Cl. 179—171)

My invention relates to an electrical circuit for attenuating electrical energy according to a chosen function of the frequency thereof, and particularly to a device of this type that has multiple attenuation adjustments over an extended frequency range.

In the audio range of frequencies the value of obtaining desired performance by altering the amplitude of alternating electrical energy as a function of frequency is well established. Usually, an attenuator used to accomplish this end is either fixed or is variable in a simple way to affect a relatively broad brand of frequencies. The tone control of a radio receiver is an example.

Particularly in the field of electrically produced mechanical vibrations a much greater precision and versatility of attenuation is desirable. This allows compensation for equipment or specimen characteristics and also makes possible specific performance over selectable frequency bands for particular tests. One such test requirement is the specification that the energy of random noise increases 6 db per octave of frequency over a considerable range of frequencies.

In attempting to produce a suitable equalizer of this type I found that ordinary design considerations would not produce a satisfactory device. While it would be expected that consideration of the amplitude characteristic would be sufficient I found that the phase characteristic is involved. Electrical energy of frequencies at the edges of the passed band of one filter when combined with the same from the edges of the passed band of the adjacent filter resulted in an unwanted variation of the composite amplitude pass characteristic of the equalizer.

Other attempts to attain a complementary trigonometrical relationship equalling unity required a large number of vacuum tubes and actually had a serious variation of composite amplitude pass characteristic because of phase factors that could not be resolved.

I determined that both the pass band interval of frequency of each individual filter and the nature of the slope at the edges, or "skirts" were critical factors.

Briefly, I attained an equalizer of superior characteristics having a minimum number of vacuum tubes and other elements of complexity in the following manner.

The interval of the pass band was taken as the octave. In a typical embodiment of my invention the first octave starts at 2 cycles and the last at over 8,000 cycles; a total of 13 octaves. An input amplifier having a cathode-follower output stage feeds all of the filters in parallel. Each filter is of the resistance-capacitance type and has two high pass and two low pass sections, alternately connected. The termination of the second low pass section is a potentiometer and constitutes the attenuation control for that octave. Through a relatively large value series resistor or equivalent impedance for isolation each of the filters are connected in parallel to an output amplifier. The latter has negative feedback for gain stabilization and a cathode-follower output stage. The input and output amplifiers are common to all filters; one or more stages of amplification for each filter are not employed. The large value series resistors effect isolation from filter to filter and the attenuation thereby introduced is overcome by nominal gain in both input and output amplifiers.

The octave band pass filters are composed to have relatively narrow skirts, 6 db down at the first octave away and 12 db down farther away. The skirt attenuation has been arranged so that the reactive components of the filter impedance thereat on frequency adjacent octaves have equal values of magnitude but opposite sign; i.e., $+j$ and $-j$, and thus cancel. In a multiply adjustable equalizer of this kind it is highly desirable to have an essentially "flat characteristic" when all octave filters are set to the same attenuation. The meagre prior art has been content to accomplish this to the order of $\pm 3$ db but I have reduced this to $\pm 0.36$ db by my discoveries.

An object of my invention is to provide a differentially adjustable equalizer having relatively independent adjustments as to attenuation effect for each octave of frequency over an extended frequency band.

Another object is to provide a multiply adjustable equalizer having a uniform attenuation with frequency when all of the adjustments are set at the same value of attenuation.

Another object is to provide such a device having relatively few amplifier stages.

Another object is to provide such a device in which reactive components of adjacent octave filter elements cancel by being of equal magnitude and opposite sign at common frequencies.

Other objects of my invention will become apparent upon reading the following detailed specification and upon examining the accompanying drawings, in which.

Figure 1:
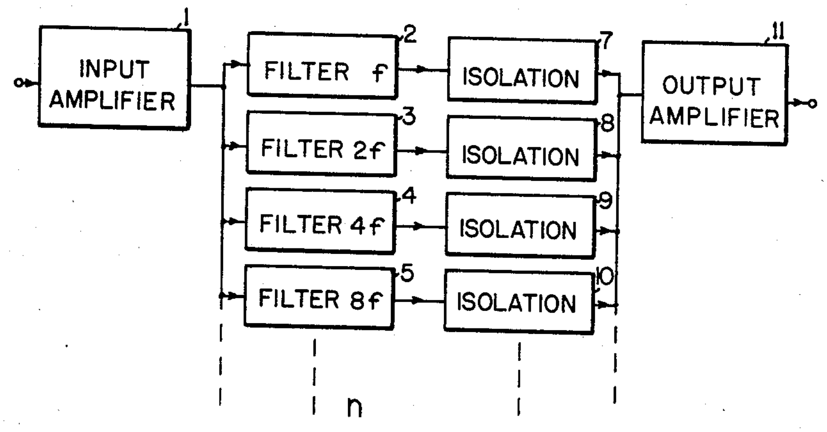
Fig. 1 shows a block diagram of my invention.

In Fig. 1 numeral 1 represents an input amplifier, employed principally to prevent a prior circuit altering the input impedance of the filter, to provide part of the amplification necessary to compensate for the insertion loss of the filter, and to provide a cathode-follower input thereto. Connected to the cathode of the cathode-follower, in parallel, are separate band pass filters 2, 3, 4, 5, etc. each passing a frequency octave, i.e., f, 2f, 4f, 8f . . . *n*f. These feed into individual isolating impedance means 7, 8, 9, 10, etc. All the isolation outputs are fed in parallel to the input of output amplifier 11. The latter has more tubes than the input amplifier and utilizes inverse stabilizing feedback.

Figure 2:
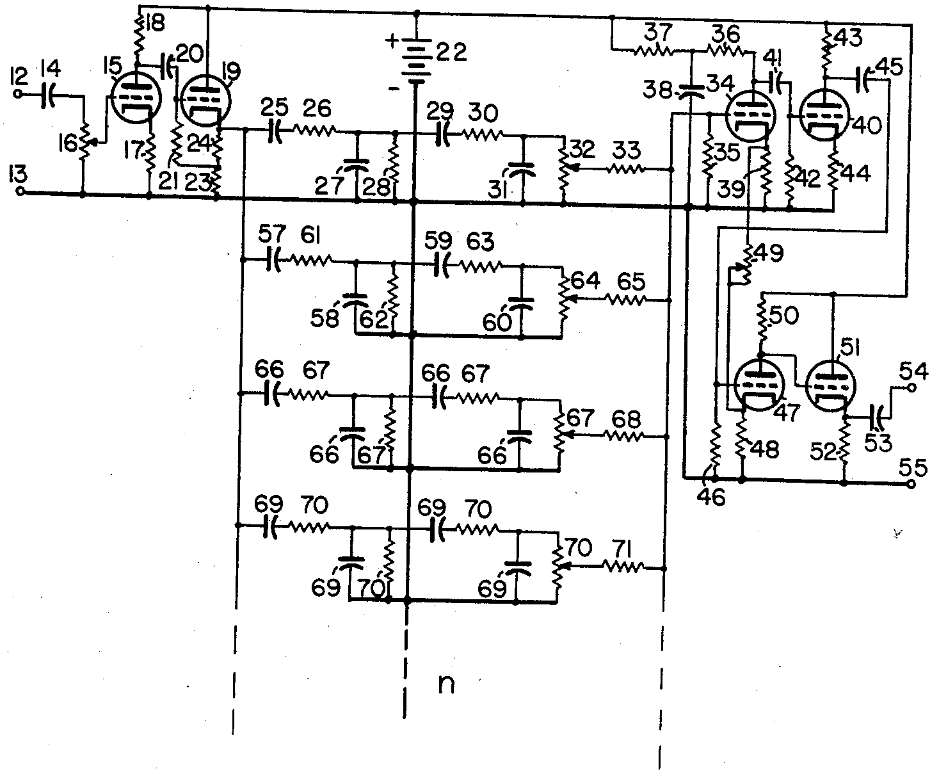
Fig. 2 is the schematic diagram for my invention.

In Fig. 2 terminal 12 is the high impedance or signal input terminal while 13 is the common or ground input terminal. Capacitor 14 is for D.C. input isolation and is connected to the grid of triode 15 over grid return potentiometer 16; the latter allowing adjustment of overall gain.

The time constant of the RC combination 14, 16 is of the order of a second in this preferred embodiment for electromechanical vibration work. It may be less for purely audio or supersonic frequencies. Resistor 17 is connected to the cathode of triode 15 for establishing a self bias and has a resistance of several thousand ohms. Resistor 18 is connected to the plate of triode 15 and has a resistance of the order of one-fourth megohm. It also connects to plate battery 22, the latter having low internal impedance. Triode 19 is coupled to the plate of triode 15 by RC coupling circuit 20, 21, having a time constant of the order of one-fourth second. The plate of triode 19 is connected directly to the positive terminal of battery 22. The cathode thereof is connected to split cathode resistor 23, 24, having resistances of the orders of ten thousand and one thousand, respectively, ohms.

Series connected capacitor 25 and resistor 26 comprise the first high pass filter section. Assuming this filter to be the extreme low frequency one the capacitor has a value of the order of 2 microfarads and the resistor a resistance of approximately 40,000 ohms. Shunt connected capacitor 27 and resistor 28 comprise the first low pass filter section and have the same values as before. Series connected capacitor 29 and resistor 30 comprise the second high pass filter section and have the same values as before. Shunt connected capacitor 31 and resistor 32 comprise the second low pass filter section and also have the same values as before. Resistor 32 is a potentiometer and the position of the variable arm determines the attenuation of the filter. This is a loss of the order of 55 db when the arm is in the center resistive position, of 49 db when in the upper position and of 100 db in the lower position.

Resistor 33 is connected to the variable arm and is for isolating the first filter from the others. It has a resistance of the order of one megohm.

The grid of triode 34 is connected to resistor 33 over grid return resistor 35, which has a resistance of the order of 100,000 ohms. Resistor 36 is connected to the plate of triode 34 and to a decoupling resistor 37, which latter is connected to the positive terminal of battery 22. These resistors have a resistance of the order of 40,000 ohms each. Decoupling capacitor 38 has a capacitance of 20 microfarads. Resistor 39 is an unbypassed self-bias resistor connected to the cathode of triode 34 and has a resistance of a few thousand ohms.

The grid of triode 40 is connected to the plate of triode 34 through RC coupling circuit 41, 42, having a time constant of the order of one-fourth second. The plate of triode 40 is connected to plate resistor 43, having a resistance of the order of a quarter megohm and thence to the positive terminal of battery 22. The cathode of triode 40 is connected to signal ground conductor 13 through a resistor 44 having a resistance of several thousand ohms. Capacitor 45 and resistor 46 are an RC coupling circuit connecting the plate of triode 40 to the grid of triode 47 and having a time constant of the order of one second. Resistor 48 is an unbypassed self-bias resistor connected to the cathode of triode 47 and has a resistance value of a few thousand ohms.

I have found it desirable to employ gain-stabilizing negative feedback in the output amplifier. Accordingly, variable resistor 49 is connected between the cathodes of triodes 34 and 47, the maximum resistance value of resistor 49 being a few thousand ohms.

The plate of triode 47 is connected to plate resistor 50, having a resistance of the order of 50,000 ohms. The grid of cathode-follower output triode 51 is direct connected to the plate of triode 47. The cathode of triode 51 is connected through a resistor 52, having a resistance of the order of 50,000 ohms, to signal ground. Capacitor 53 connects between the cathode of triode 51 and the signal output terminal 54, the capacitance value being of the order of one microfarad. Output terminal 55 connects to the common signal ground conductor and therethrough to the corresponding input terminal 13.

The adjacent pairs of tubes in the input and the output amplifiers may be of the twin type, such as the 6SN7.

In the same manner as the first filter, the second, for the octave starting at 4 cycles, has two high pass and two low pass sections and the same circuit connections as before. Capacitors 57, 58, 59, 60 all have a capacitance of the order of one microfarad. Resistors 61, 62, 63, 64 all have a resistance of the order of 40,000 ohms, and resistor 65 of one megohm. The attenuation is the same as for the first filter.

Similarly, for the third filter starting at 8 cycles the capacitance of all capacitors 66 is of the order of a half microfarad and the resistance of all resistors 67 is 40,000 ohms. Resistor 68 is again one megohm.

Further, for the fourth filter starting at 16 cycles the capacitance of all capacitors 69 is of the order of one-fourth microfarad and the resistance of all resistors 70 is 40,000 ohms. Resistor 71 is again one megohm.

Continuing with the now obvious pattern of values my preferred embodiment has thirteen filters with the highest octave starting at 8192 cycles and employing capacitors of 0.0005 microfarad and resistors of 40,000 ohms for that octave.

In a typical mechanical embodiment of my invention the adjustments for the variable arms of potentiometers 32, 64, 67, 70, etc. are placed side by side in slots. The frequency designating the octave is engraved above each slot as well as a scale of reference attenuation reading above and below from a central point. The potentiometers may be of the linear lever arm strip-wound type or of the usual rotary type with a radio dial type cable drive from the mechanical levers on the front panel. When thus positioned the settings of the several lever arms give a visual indication of the electrical characteristic of the equalizer over the whole frequency range. This has certain obvious advantages in informing the operator as to the frequency-amplitude characteristic of the equalizer.

It will be understood that the input and output connections may be accomplished by means of communications type electrical connectors and that signal leads may be coaxially shielded to reduce residual interference and any tendency toward positive feedback.

Printed circuits may be used for each of the identical filter circuits and the resistances thereof. This enhances physical compactness and allows the filters to be placed close together.

Because each of my filters is composed of two pairs of sections and the resulting attenuation characteristic has relatively narrow skirts as a function of frequency the reaction of the attenuation of one filter upon the attenuation of adjacent filters is relatively small. In the extreme condition of placing all potentiometer arms at maximum attenuation, save one which is placed at minimum attenuation, it is found that a certain attenuation will be measured at a frequency within the octave represented by the potentiometer arm that is at minimum. If, now, all the arms that were at maximum attenuation are moved to minimum attenuation and the attenuation at the above-mentioned frequency is again measured it will be found that this has decreased by only 6 db. While zero db decrease is the ideal, it will be found in the usual case of frequency adjacent filters that the alteration of attenuation for the manipulation described will be very considerably more than with my equalizer.

It will be understood that the plate supply battery 22 may be replaced by the usual A.C. to D.C. power supply, which is preferably regulated. Also, heater elements have not been shown in the vacuum tubes, nor have the circuits therefor, all of which are standard.

In a typical embodiment of my invention the means value of attenuation of the filters and the combined gain of amplifiers 1 and 11 of Fig. 1 are approximately equal. It is not necessary to retain this ratio in order to realize the benefits of my invention. Receiver type vacuum tubes and other components are employed. Pentode vacuum tubes may be used instead of the triodes shown. Any fewer number than the thirteen filters mentioned may be made into an equalizer according to my invention.

My equalizer may be built to encompass higher frequency ranges, or a lesser or greater frequency range, but the octave spacing and the nature of the filter attenuation characteristic described may not be departed from to any considerable extent and still retain all the advantages of my invention.

My device is suitable for miniaturization by changing to miniature tubes and small components. Encapsulation of elements other than the potentiometer 32, et al. that must move may also be achieved.

Various modifications in the power handling capability of my device, in the characteristics and nature of the circuit elements and in the connections thereof may be made without departing from the scope of my invention.

Having thus fully described my invention and the manner in which it is to be practiced, I claim:

1. An electrical equalizer having a pass band individually adjustable over plural adjacent octaves in frequency comprising a single input amplifier, the same plurality of exclusively passive low pass and high pass filter groups alternately cascade-connected and connected in parallel to said amplifier output, the impedance of said amplifier output being low with respect to the impedance of said parallel connected filters connected thereto, each said group defining a band pass interval of substantially an octave and composed of similar elements similarly connected, means to independently adjust the attenuation of each said group to have a small effect on the attenuation of adjacent octave groups, and a single output amplifier having only tandem-connected stages, the first stage thereof connected to said filter groups in parallel through fixed high impedance passive isolating means with respect to the impedance of each said filter group.

2. An alternating current electrical adjustable attenuation equalizer operative over plural frequency adjacent octaves comprising a single input amplifier having a cathode-output stage, plural exclusively passive band pass filters each composed of successively connected high and low pass filters and having means to individually adjust electrical attenuation, said filters connected directly in parallel to said input amplifier cathode-output stage, the impedance of said cathode-output stage being low with respect to that of said paralleled filters, the pass band of each of said filters including approximately one octave and having a relatively rapid increase of attenuation with frequency beyond said octave, a single output amplifier having only cascade-connected stages, each said band pass filter connected to the input of said output amplifier through only a fixed resistor, said relatively rapid attenuation with frequency attained by said successive high and low pass filters proportioned to provide a relatively uniform attenuation with frequency over said plural octaves when all said means to adjust electrical attenuation are adjusted for the same attenuation.

3. A differentially adjustable equalizer embracing plural octaves in frequency comprising a single input amplifier having an output impedance of less than two hundred ohms, plural exclusively passive band pass filters connected directly in parallel to said input amplifier cathode-output stage, each having an input impedance much greater than two hundred ohms, each said filter having means to individually and selectively adjust electrical attenuation, the pass band of each of said filters including an octave of frequencies and a relatively sharp increase of attenuation with frequency beyond said octave, a single output amplifier having only successively-connected stages, each said band pass filter connected to the input of said output amplifier through a separate fixed isolating resistor, said relatively sharp increase in attenuation with frequency proportioned to give conjugate phase of one filter with respect to the adjacent filter and to provide a relatively uniform attenuation with frequency over said plural octaves when all said means to adjust electrical attenuation are adjusted for the same attenuation.

4. An equalizer differentially adjustable over plural adjacent octaves of frequency comprising only one input amplifier having a cathode-follower output, plural exclusively passive band pass filters directly parallel connected to said cathode-follower output, each said band pass filter having plural cascade connected alternate high and low pass filter sections to pass substantially an octave of frequency, a single output amplifier common to all said band pass filters, each said band pass filter connected to the input of said single output amplifier through a fixed resistor of the order of one megohm resistance; each said band pass filter constituted to have that attenuation versus frequency characteristic which causes the attenuation thereof in combination with that of adjacent frequency band pass filters to be independent of reactive impedance components.

5. An equalizer having attenuation adjustable over a contiguous range of frequencies comprising an input amplifier having a low impedance cathode output, plural exclusively passive band pass filters connected directly in parallel to said output and constituting a high impedance load thereon, each said band pass filter having plural unlike successive filter sections to pass a substantially unique passive band of frequencies, single independent means to adjust the attenuation of each said band pass filter, a single output amplifier having only cascade-connected stages, each said band pass filter connected to said output amplifier through a fixed resistor of high resistance with respect to the impedance of each said filter; each said passive band pass filter constituted to bear an octave relation to each adjacent frequency band pass filter and to have that attenuation versus frequency characteristic by virtue of said plural unlike filter sections which causes the reactive component of the impedance of the band pass filter of one octave to cancel the reactive components of the band pass filters of adjacent octaves as driven by the low impedance output of said input amplifier.

6. An adjustable attenuation equalizer embracing a single band of frequencies having passive filter elements and amplifier elements separately grouped comprising only one input amplifier having a cathode-follower stage, a plurality of exclusively passive high pass filter elements, each having a different related pass frequency and being connected directly to said cathode-follower, a plurality of exclusively passive low pass filter elements each directly connected to the said high pass filter element corresponding in frequency to an octave away, a second plurality of exclusively passive high pass filter elements similarly connected to said low pass filter elements, a second plurality of exclusively passive low pass filter elements similarly connected to said second plurality of high pass filter elements, said second plurality of low pass filter elements each connected through a fixed resistor of resistance high with respect to the impedance of said filter elements to a common connection, only one output amplifier connected to said common connection; each of said filter elements composed of a resistor and a capacitor, each combination of the recited high, low, second high and second low pass filter elements thus constructed and connected to pass only approximately one octave of frequency band with equal reactive impedance of opposite sign between adjacent octave filters thereby, said equalizer adapted to impose a gain versus frequency characteristic largely determined by the individual settings of each said potentiometer without regard to the setting of said potentiometers controlling adjacent octaves of frequency.

References Cited in the file of this patent

UNITED STATES PATENTS

| | | |
|---|---|---|
| 2,128,257 | Lee et al. | Aug. 30, 1938 |
| 2,558,868 | McCarty | July 3, 1951 |
| 2,593,490 | Sanders | Apr. 22, 1952 |
| 2,694,142 | Laidig | Nov. 9, 1954 |
| 2,709,206 | Ferguson | May 24, 1955 |
| 2,716,733 | Roark | Aug. 30, 1955 |

OTHER REFERENCES

Publication, Audio Engineering, September 1953, pages 29, 58, 59, "Flexible Tone Control Circuit," by Barber.